UNITED STATES PATENT OFFICE.

JOHN ECKART, OF MUNICH, BAVARIA, GERMANY.

COMPOUND FOR PRESERVING MEATS AND FISH.

SPECIFICATION forming part of Letters Patent No. 251,772, dated January 3, 1882.

Application filed November 18, 1880. (Specimens.)

*To all whom it may concern:*

Be it known that I, JOHN ECKART, of Munich, Kingdom of Bavaria, Germany, have invented a certain new and useful Preserving Compound, of which the following is a specification.

Instead of the solution mentioned in my United States Patent No. 194,550, dated August 28, 1877, in which a half-pound of salicylic acid in one hundred pounds of water was used for preserving animal or vegetable matter, I use the following preserving-salt, consisting of a mixture of fifty per cent. of common salt, forty-seven and one-half per cent. of chemically pure boracic acid, two per cent. of tartaric acid, one-half per cent. of salicylic acid. This salt is applicable to preserving any sort of meats for food, but particularly so for fish. The flesh of fishes immediately after they are caught is separated from the skin and bones. I mix the flesh with my preserving-salt in the proportions of about twenty grams of the salt with one kilogram of flesh. The flesh is afterward filled into gut or artificial cases of parchment or other flexible material. These flexible cases are then packed or filled into casks or other vessels, after which these casks are filled up with a gelatine solution, made in the proportion of about fifty grams of gelatine, twenty grams of the preserving-salt, and one thousand grams of water, and submitted to a pressure in the following manner: The casks being strong and tight, their interior is put in communication with the pressure-pipe of a pump and hermetically closed, more of the solution is pumped into the cask until the pressure-gage with which it is supplied shows a pressure up to twelve atmospheres or more. This presure is maintained from fifteen to thirty minutes, more or less, according to the requirements of the case, until the contents are completely saturated. Then an air-valve is opened and the pressure relieved, and the cover removed and the contents taken out. The gut or cases may then be strewn over with more of the salt in a dry condition and stored in vessels for shipment, and may be covered with a solution of the preserving-salt in water.

By this method of packing the flesh of fish or other substances they are thoroughly saturated and the air is entirely excluded therefrom under all circumstances during the storage in the vessels and transportation.

I call such fish, preserved, filled, and packed in the manner described, "rolled" fish.

Other meats may be treated in a similar way, and the effect will be as satisfactory.

I do not herein claim the gelatine solution, as I propose to make it the subject of a separate application for patent.

Modifications may be made in the proportions to a limited extent. Parts of the invention may be used without the others. I can omit the packing in gut. I can omit the addition of gelatine; but I prefer the whole used together.

I am aware that salt and the acids named herein have been used as preservatives separately and in other combinations, and I do not claim them except as herein set forth.

I claim—

1. The preserving-salt composed of chloride of sodium and boracic acid with the smaller quantities of tartaric and salicylic acid, substantially as herein specified.

2. The sausage described, having a filling of meat saturated with the preserving-solution, as herein specified.

In testimony whereof I have hereunto set my hand.

JOHN ECKART.

Witnesses:
WILHELM WIESENHÜTTER,
MARTIN KÖRNER.